(12) United States Patent
Solis Vidal

(10) Patent No.: US 11,847,901 B2
(45) Date of Patent: Dec. 19, 2023

(54) ADDRESSING FOR FIRE LOOP

(71) Applicant: Carrier Corporation, Palm Beach Gardens, FL (US)

(72) Inventor: Pablo Solis Vidal, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/859,526

(22) Filed: Jul. 7, 2022

(65) Prior Publication Data

US 2023/0018171 A1 Jan. 19, 2023

(30) Foreign Application Priority Data

Jul. 8, 2021 (EP) ..................................... 21382619

(51) Int. Cl.
 *G08B 25/00* (2006.01)
 *G08B 25/04* (2006.01)
 *G08B 17/113* (2006.01)
 *G08B 5/36* (2006.01)

(52) U.S. Cl.
 CPC ............. *G08B 25/003* (2013.01); *G08B 5/36* (2013.01); *G08B 17/113* (2013.01); *G08B 25/04* (2013.01); *H04B 2203/5458* (2013.01)

(58) Field of Classification Search
 CPC ........ G08B 25/04; G08B 25/003; G08B 5/36; G08B 17/113; H04B 2203/5458
 See application file for complete search history.

(56) References Cited

U.S. PATENT DOCUMENTS

| 4,988,977 A | * | 1/1991 | Payne | ................... | G08B 25/003 |
| | | | | | 340/532 |
| 5,818,334 A | | 10/1998 | Stanley | | |
| 7,896,238 B2 | * | 3/2011 | Fein | ..................... | G06Q 20/352 |
| | | | | | 235/379 |

(Continued)

FOREIGN PATENT DOCUMENTS

| EP | 0362985 A1 | * | 5/1989 |
| EP | 0362985 A1 | | 4/1990 |

(Continued)

OTHER PUBLICATIONS

Author Unknown, "TCS3472 Color Light-to-Digital Converter with IR Filter", ams Datasheet; Apr. 10, 2020, 40 Pages.

(Continued)

*Primary Examiner* — John A Tweel, Jr.
(74) *Attorney, Agent, or Firm* — CANTOR COLBURN LLP

(57) ABSTRACT

An address system for at least one fire loop 20 includes at least one remote unit 14, 16, 18 and an address card 102. The remote unit 14, 16, 18 is for installation on the fire loop 20 and for addressable communication via the fire loop 20. The address card 102 is for use with the remote unit 14, 16, 18 in order to provide an address for the remote unit 14, 16, 18. The address card 102 includes one or more of a plurality of optically recognisable colour elements 201-210 for encoding an address. The remote unit 14, 16, 18 includes an optical sensor 116 for identifying colour characteristics of the optically recognisable colour elements 201-210, and a control system 118 for determining the address from the colour characteristics.

15 Claims, 5 Drawing Sheets

(56) References Cited

U.S. PATENT DOCUMENTS

| | | | |
|---|---|---|---|
| 2004/0212493 A1* | 10/2004 | Stilp | G08B 25/10 |
| | | | 340/541 |
| 2012/0201326 A1 | 8/2012 | Burns et al. | |
| 2015/0104183 A1* | 4/2015 | Jeffrey | H04N 21/44008 |
| | | | 398/130 |
| 2017/0230930 A1* | 8/2017 | Frey | H04W 4/80 |
| 2022/0108594 A1* | 4/2022 | Farley | H04B 5/0025 |

FOREIGN PATENT DOCUMENTS

| | | | |
|---|---|---|---|
| GB | 2459323 A | | 10/2009 |
| WO | 9705587 A1 | | 2/1997 |
| WO | 2006049614 A1 | | 5/2006 |
| WO | 2017217977 A1 | | 12/2017 |
| WO | 2020162956 A1 | | 8/2020 |
| WO | WO-2022155011 A1 | * | 7/2022 |

OTHER PUBLICATIONS

Author Unknown, "WL-SFCW SMD Full-color Chip LED Waterclear", Würth Elektronik eiSos GmbH & Co KG, Aug. 11, 2011, 8 Pages.
Author Unknown, "XP95 Product Guide (Australia) MAN 3049", Ampac Advanced Warning Systems, May 2017, 22 Pages.
European Search Report for Application No. 21382619.1; dated Jan. 19, 2022; 5 Pages.

* cited by examiner

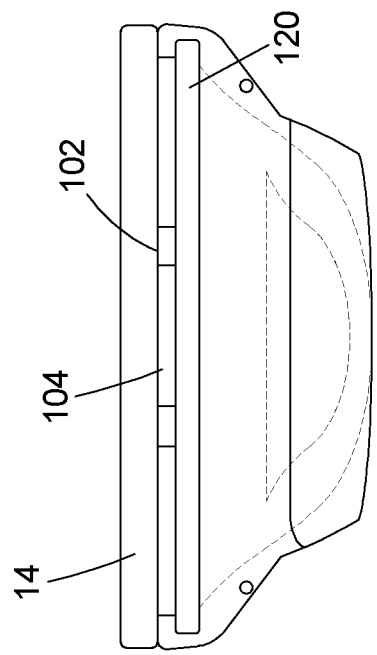
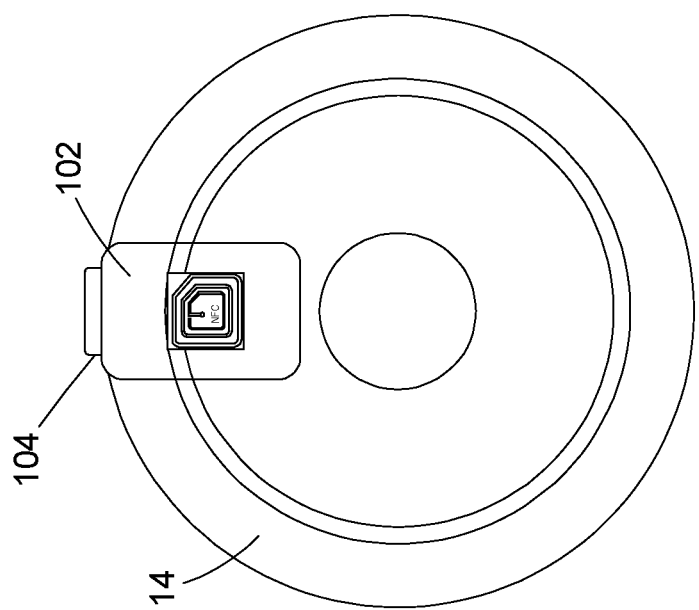

ADDRESSING FOR FIRE LOOP

FOREIGN PRIORITY

This application claims priority to European Patent Application No. 21382619.1, filed Jul. 8, 2021, and all the benefits accruing therefrom under 35 U.S.C. § 119, the contents of which in its entirety are herein incorporated by reference.

TECHNICAL FIELD OF INVENTION

The present invention relates to an address system for a fire loop and to a related method for addressing a remote unit on a fire loop. The address system may be used within a fire system for a building, the fire system comprising: a fire panel for monitoring the building and activating an alarm; and a plurality of remote units electrically connected to the fire panel in a fire loop.

BACKGROUND OF THE INVENTION

Typically, there is a regulatory requirement in buildings to have a fire system in place. These fire systems are used to identify possible fires in the building and alert authorities and/or occupants of the building of the possible fire. In some instances, fire systems can also identify other types of emergency, such as other emergencies that require evacuation of the building. Typical fire systems employ a fire panel and a number of remote units, with some of the remote units comprising indicating devices (e.g. smoke alarms, manual call points, heat detectors, etc.) and/or indicator devices (e.g. sirens, bells, lights, etc.). The remote units are typically distributed across the building and are connected to the fire panel through a communications network. There may be additional devices in the fire system, such as fire extinguishing devices that can be automatically triggered via the fire panel. In some fire alarm systems, the remote units are electrically connected to the fire panel in a loop configuration, and communication between the remote units and fire panel is achieved by modulating the current and voltage in the loop. The fire panel may determine specific actions for different zones of a building depending on the nature and location of the emergency. For example, the fire panel may raise an alarm across the whole building, but only trigger the fire extinguishing devices in the zone of the building where a fire has been detected. The fire panel may be connected to a further communication network, such as a WiFi network or telephone network, for the purposes of alerting authorities to the emergency.

In known systems, the fire panel and the remote units typically communicate through a master-slave communication system. This may involve the fire panel receiving an input from a remote unit in the form of a modulation in the current and, if the input is indicative of a possible emergency, communicating an alarm condition in the form of modulations in the voltage to other remote units. Alternatively or additionally it has been proposed to use other network communication protocols, such as via mesh networks. Whichever type of communication is used it is necessary to have an address, e.g. an identifier, for each of the remote units on the fire loop circuit.

In order to allow for each remote unit to have a unique address various systems have been proposed in the prior art. They can be considered to generally fall into two categories, being fully electronic/data based systems, or being electro-mechanical arrangements. The fully electronic systems use electronic data storage means to store the address, such as a memory within a control system of the remote unit. Typically a specialised tool is required during installation in order to complete the addressing and store the address in the internal memory of the remote unit. Electro-mechanical arrangements can provide advantages over that by avoiding the need for an external tool and allowing for manual changes by the installer, such as by means of DIP switches or rotary switches. In some known devices a card with punched holes is used along with mechanical switch elements that engage with the card. Whilst there is an advantage from avoiding the need for an external tool these electro-mechanical systems are at risk of mechanical failure and add significantly to the complexity of the remote unit due to the number of switching components that are required for a suitably large number of unique addresses. Such devices also add significantly to the time needed for installation and can have a risk of human error leading to incorrect addressing.

SUMMARY OF THE INVENTION

Viewed from a first aspect, the invention provides an address system for at least one fire loop, the address system comprising: a remote unit for installation on the fire loop, wherein the remote unit is for addressable communication via the fire loop; and an address card for use with the remote unit in order to provide an address for the remote unit; wherein the address card includes one or more of a plurality of optically recognisable colour elements for encoding an address; and wherein the remote unit comprises an optical sensor for identifying colour characteristics of the optically recognisable colour elements, and a control system for determining the address from the colour characteristics.

With this system it is possible to allow for a large number of unique addresses that can be provided to the remote unit during installation, or otherwise, simply by using the relevant address card. This enables a quick and reliable installation/set-up for the address system, as well as considerably simplifying the remote unit compared to the prior art electronic or electro-mechanical devices. The use of optical sensors rather than mechanical elements removes one source of potential failure and/or error in the address system.

The control system may be coupled to the optical sensor in order to receive an output signal from the optical sensor. The output signal may be indicative of the colour characteristics, such as by comprising a digital signal representative of the colour characteristics. Thus, the control system may be for reading the address from the address card by use of the optical sensor. In some examples the sensor is in communication with the control system via Inter-Integrated Circuit (I2C) communications. The connections to the control system may also include a power connection for the optical sensor.

The addressing system uses a plurality of optically recognisable colour elements as a way to encode address information. The address card includes one or more of the possible optically recognisable colour elements and the presence or absence of the possible optically recognisable colour elements can be detected by the optical sensor. Advantageously, as further described below, a binary encoding system may provide a large number of unique addresses using a relatively small number of possible optically recognisable colour elements.

One possible type of optical sensor is a RGB (red, green, blue) colour sensor, which may be a colour light-to-digital convertor. Such a sensor may provide a digital output signal indicating red, green and blue sensing values of the sensed colour(s) as well as optionally a clear light sensing value. The optical sensor may comprise an integrated light, such that it may not depend on ambient light and/or so that it can provide sensor readings irrespective of the ambient light conditions. The optical sensor may include optical or digital IR and/or UV filtering to enable accurate sensing under a range of ambient lighting conditions including, for example, artificial light. For example the optical sensor may include on-chip IR filtering. One example sensor is the TCS3472 RGB sensor as manufactured/supplied by ams AG of Austria.

There may be more than one optical sensor, for example a plurality of sensors of the same type. One example implementation uses two optical sensors with each sensor providing sensor readings in respect of at least half of the optically recognisable colour elements. Typical sensors may for example have a working angle of about 100°, and using more than one sensor allows for a closer distance between the sensor(s) and the location of the address card, which reduces volume required for the address system, i.e. the volume within the remote unit.

The address card may use binary encoding via the optically recognisable colour elements, for example by use of a plurality of differing colour elements having differing colours, wherein the presence or absence of a colour relates to a binary value. There may be at least 6 differing colours, at least 8 differing colours, or at least 10 differing colours. A system using 10 colours and binary encoding can provide the same number of unique addresses as an electro-mechanical system with 10 DIP switches, i.e. 1024 unique addresses via the binary encoding.

It is an advantage for the optically recognisable colour elements to be readily distinguishable by the human eye in order that the installer can, if needed, manually cross-check address details for different address cards and/or can easily differentiate between address cards by visual comparison of the address represented by the colour elements. However, it will be appreciated that in some circumstances it may be beneficial to include other optically recognisable colour elements visible only to the optical sensor or to a further different optical sensor. That may allow for added information to be encoded without visibility to the installer, e.g. for security such as for counterfeit protection.

The optically recognisable colour elements may each comprise patches of a distinct colour, such as one or more of brown, red, orange, yellow, green, blue, purple, grey, white and black. In some examples these 10 colours are used, advantageously using the same colour standards as colour coding for electrical resistor components (in particular the EIA colour code). Such colours can be readily identified by known RGB values and have also been selected to be readily distinguishable by the human eye. A specific example uses the following binary encoding system:

| Colour | R | G | B | Address/encoding |
| --- | --- | --- | --- | --- |
| Brown | 116 | 66 | 0 | 1 |
| Red | 255 | 0 | 0 | 2 |
| Orange | 237 | 127 | 49 | 4 |
| Yellow | 255 | 255 | 0 | 8 |
| Green | 0 | 255 | 0 | 16 |
| Blue | 0 | 0 | 255 | 32 |
| Purple | 76 | 40 | 130 | 64 |
| Gray | 191 | 191 | 191 | 128 |
| White | 255 | 255 | 255 | 256 |
| Black | 0 | 0 | 0 | 512 |

In some examples the address card has the form factor of a card, i.e. a sheet of relatively thin material in a rectangle shape or another two dimensional shape. The address card may be for physical engagement with a card holder of the remote unit. For example it may be insertable into a card slot. Such a card slot may include an opening, which may have a width considerably greater than its height, such as more than 8 times greater. The address card may have a first surface with the optically recognisable colour elements visible thereon. The first surface may be a two dimensional planar surface. The address card may have a second surface opposite the first surface, and the two surfaces may be separated by a card thickness, such as a thickness in the range 0.5 to 2 mm.

The remote unit may comprise a mounting for receiving the card, such as a card holder for fully or partially receiving the extent of the address card. The mounting may comprise a card slot. Such a card slot may include an opening, which may have a width considerably greater than its height, such as more than 8 times greater. The card slot and/or the opening may have a width and height larger than the width and thickness of the address card in order to permit insertion of the card. The card slot may have a length smaller than the length of the address card in order that an end of the address card protrudes from the card slot when the address card is inserted therein.

The optical sensor may be located within the interior of the remote unit at the mounting so that it is able to sense the optically recognisable colour elements when the address card is in the mounting. Thus, in the case of a card slot the optical sensor may be positioned inside the remote unit in a location that faces a surface of the address card when the address card is inserted in the card slot.

Optionally the address card comprises a Near Field Communications (NFC) tag. This can further enhance the capabilities of the address card. For example, the NFC tag may comprise an NFC memory with commissioning and/or manufacturing data relating to the address card and/or to the remote unit. The address card may be one of many similar address cards each with unique ID within the NFC tag and with unique colour characteristics for addressing as discussed above. With the addition of an NFC tag the user, e.g. the installer or operator, may use an NFC reader to obtain added information from the address card. Further, optionally, the remote unit may include an NFC reader in order to provide a means to detect the presence/absence of the address card as well as to potentially obtain more data from the address card in addition to the address information that is detectable via the optical sensor.

The remote unit may be one of multiple remote units as described above, with each remote unit being provided with an address card. Thus, the addressing system may comprise multiple remote units for the at least one fire loop, wherein addressing for the multiple remote units is provided by means of multiple address cards. The different address cards for the multiple remote units advantageously have differing patterns of colour by means of a differing set of one or more of the plurality of optically recognisable colour elements. Thus, each address card has a different set of colours. There may for example be 10 or more remote units, 50 or more remote units, or 100 or more remote units. Some installations may require many hundreds of such units, e.g. within rooms of a building or rooms/compartments of a ship. All of the remote units may be on a single fire loop or in some cases there may be more than one fire loop, e.g. separate fire loops for different areas of the installation such as different floors of a building, with the remote units being distributed between the more than one fire loop. In the example mentioned above using 10 different possible optically recognisable colour elements there are 1024 unique addresses and hence this allows for a full set of address cards to permit 1024 uniquely addressed remote units on a single fire loop.

The remote units are arranged to be electrically connected in a loop configuration, and the fire loop may be a circuit comprising connecting wiring starting and finishing at the fire panel. In some examples the invention includes the fire loop and optionally also the fire panel. The fire panel may be configured to monitor alarm conditions and possible emergencies in the building based on signals received from at least some of the remote units, and may be configured to trigger an alarm condition in at least some of the remote units in response to an indication of a possible emergency. The fire panel may be configured to monitor the voltage and/or current in the circuit in order to detect any signals from the remote units, and may comprise means for altering the voltage and/or current in the circuit in order to trigger an alarm condition throughout the loop. The fire panel may be further configured to monitor faults in the circuit, such as short circuits and/or line breaks.

The fire panel, where present, may comprise a loop controller for controlling the operation of the fire loop. The loop controller may be a part of a fire panel control system that also has overall control of the fire panel and its functions, or it may be a separate hardware or software element compared to such a control system. The loop controller may be a central processing unit (CPU). The loop controller may be configured to determine a response to the communications from the remote units. For example, in response to information from one of the remote units, the loop controller may be configured to determine that all or some of the remote units should enter an alarm condition. The loop controller may be configured to determine that only the remote units in the same zone as the emergency should enter an alarm condition, and/or that some remote units should enter an alarm condition at different times than others. This may aid efficient evacuation of the building in the event of an emergency.

The possible emergency may be related to a fire, for example, but it will be appreciated that the systems described herein may also be used for also other emergencies, such as non-fire emergencies requiring activation of an evacuation procedure.

The fire panel may be configured to periodically poll at least some of the remote units to monitor their status during normal operation of the fire loop. The fire panel may be configured to carry out this polling at regular time intervals. The fire panel may be configured to carry out this polling based on a predetermined communications protocol, and the frequency of polling may be determined based on the predetermined communications protocol. The fire panel may be configured to poll at least some of the remote units by transmitting one or more polling signals. The polling signal(s) may be encoded with an address of a remote unit, which may be used to communicate which remote unit the polling signal is intended for. This address is the address provided by the address card. The fire panel may be configured to poll each remote unit individually, and/or may be configured to poll groups of remote units at the same time. Polling groups of remote units at the same time may shorten the amount of time needed to poll the whole loop. The polled remote unit(s) may be configured to respond with a signal giving the status of the remote unit(s). The response signal may further comprise other information, such as the address or manufacturer code of the remote unit(s). As a result of this polling, the fire panel may be able to detect an approaching alarm condition and may take action accordingly.

As mentioned above, the remote unit(s) comprise(s) a control system for determining the address from the colour characteristics of the address card. The control system may be a microcontroller. The control system may be configured to receive and analyse any signals from the fire panel, such as from a loop controller as discussed above. The control system may be configured to decode any signals from the fire panel such that the encoded address can be determined. The control system may therefore be configured to determine whether it is the control system of the remote unit that a signal is intended for based on the decoded address. Alternatively, the remote units may comprise a unit transceiver for decoding signals received from the fire panel. The control system may be configured to determine how to respond to signals from the fire panel. For example, if a signal from the fire panel is a polling signal, the control system may be configured to determine the status of the remote unit and communicate this information back to the fire panel. Alternatively, if the signal from the fire panel indicates an alarm condition, the control system may be configured to trigger an alarm condition in the remote unit.

The remote unit, or one of multiple remote units, may comprise an indicating device, which may be a device for sensing conditions or for receiving inputs from users. For example the indicating device (as a remote unit) may include one or more of: manual call points; smoke detectors; heat detectors; other building sensors used for fire or heat detection, such as room thermostats; sensors for supervised doors; sensors for supervised fire extinguishers; water flow sensors; and so on. Input-output modules may be provided for handling information from some types of sensors that may lie outside of the fire system, such as thermostats or water flow sensors. Such information from sensors may be used with master-slave communications via the fire loop, and thus can add extra information to enable the fire panel to determine a course of action to take. In some examples, the use of this information from sensors is not available in the degraded mode. Additionally or alternatively, input-output modules may be provided for activating fire extinguishers, fire sprinklers, automatic door opening and/or closure systems, or door locking systems. The indicating device may provide inputs for triggering an alarm condition of the fire system.

Alternatively or additionally the remote unit, or one of multiple remote units, may comprise an indicator device, which may be a device for indicating an alarm condition of the fire system, such as audible or visible devices. The indicator device may include one or more of: sirens; bells; speech sounders; other types of sounders; lights; beacons or remote indicators. The indicator device may also include one or more transmitter devices for sending alarm notifications to users. Alarm notifications may be sent to local users, for example via wireless transmission of notifications to a mobile device, and/or may be sent to remote users such as building management authorities and/or emergency services.

Alternatively or additionally the remote unit, or one of multiple remote units, may comprise a combined indicating and indicator device, for example a device including detection capabilities along with an alarm, such as smoke detectors also including an audible alarm. Such a remote unit may include combinations of any of the functions discussed above in relation to the indicating and indicator devices.

Alternatively or additionally the remote unit, or one of multiple remote units, may comprise a connection module for enabling communication of an alarm condition to an external system. The connection module may be configured to connect to external hardware, and may be configured to communicate the alarm condition to the external hardware when the connection module enters an alarm condition. The external hardware may, for example, be configured to trigger an emergency call or some other form of alert to emergency services, and/or trigger an alarm condition in an external alarm system. The connection module may be configured to communicate the alarm condition to the external system in both the normal mode of operation and the degraded mode of operation. Alternatively, the fire panel may be configured to communicate the alarm condition to any external systems during the normal mode of operation, and the connection module may only be configured to take on this role in the degraded mode when the master-slave communications have failed.

As noted above the invention may be embodied in a system including the fire loop and/or a fire panel. In one aspect the invention provides a fire system comprising multiple remote units and corresponding multiple address cards and at least one fire loop, wherein the remote units and address cards together provide an address system in accordance with the first aspect. This fire system may optionally include any of the other features discussed above, as well as optionally a fire panel. The invention optionally also extends to a building incorporating the fire system, wherein the plurality of remote units may be distributed within the building.

Viewed from a further aspect, the invention provides a method for addressing a remote unit on a fire loop using an address system as defined in the first aspect, the method comprising: providing the address card at the remote unit, using the optical sensor to detect the colour characteristics of the one or more optically recognisable colour elements, and using the control system to determine the address from the colour characteristics.

The method may optionally use an address system or a fire system with any of the other features discussed above in respect of the preceding aspects.

The method may include using the control system in order to receive an output signal from the optical sensor. The output signal may be indicative of the colour characteristics, such as by comprising a digital signal representative of the colour characteristics. Thus, the control system may be used for reading the address from the address card by use of the optical sensor. The optical sensor can be as discussed above.

The method may include using binary encoding via the optically recognisable colour elements of the address card, for example by use of a plurality of differing colour elements having differing colours, wherein the presence or absence of a colour relates to a binary value. As discussed above, there may be at least 6 differing colours, at least 8 differing colours, or at least 10 differing colours. The colours used in the method may be as discussed above.

The method may include using an address card with features as discussed above, such as an address card having the form factor of a card and/or other features of shape/form discussed above. The method may include physically engaging the address card in a card holder of the remote unit. For example it may be inserted into a card slot as discussed above.

Where the remote unit comprises a mounting for receiving the card then the method may include placing the address card in the mounting, e.g. inserting it via an opening, which can be as discussed above.

Optionally the address card comprises a Near Field Communications (NFC) tag and the method includes using the NFC tag, such as by detecting the presence of the address card via NFC and/or by reading information from an NFC memory of the NFC tag. The method may include the user, e.g. the installer or operator, using an NFC reader to obtain added information from the address card. Further, optionally, the remote unit may include an NFC reader in order to provide a means to detect the presence/absence of the address card as well as to potentially obtain more data from the address card in addition to the address information that is detectable via the optical sensor. In that case the method may include the control system using the NFC reader of the remote unit, e.g. for the purposes mentioned above.

The method may be repeated for multiple remote units as described above, wherein each remote unit is provided with an address card.

The method may be carried out for addressing multiple remote units within a fire system comprising the remote units as well as corresponding multiple address cards and a fire loop. This fire system may optionally include any of the other features discussed above, including optionally a fire panel.

BRIEF DESCRIPTION OF THE DRAWINGS

Certain embodiments of the disclosure will now be described by way of example only and with reference to the accompanying drawings in which:

FIG. 4 shows a plan view of an example remote unit with the address card inserted;

FIG. 5 shows the remote unit of FIG. 4 in side view;

DETAILED DESCRIPTION OF THE INVENTION

Figure 1:
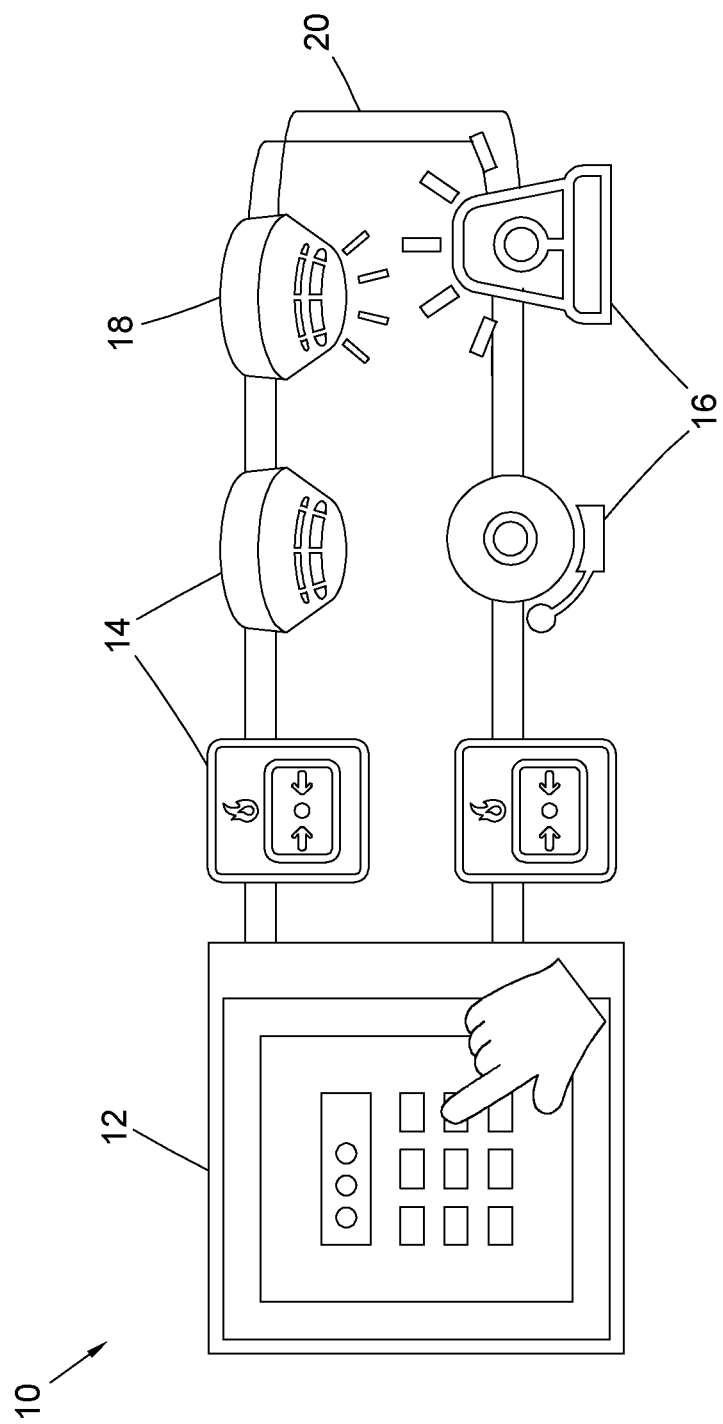
FIG. 1 is a diagram of a fire system using a master-slave communication system.

As shown in FIG. 1, a fire system 10 comprises a fire panel 12 and a number of remote units 14, 16, 18. The fire system 10 and remote units 14, 16, 18 are electrically connected in a loop configuration, joined by wire 20, with each remote unit positioned at a different location along the loop. This fire alarm 12 may be used to additionally provide power to the remote units 14, 16, 18. Alternatively, the remote units 14, 16, 18 may be powered independently of the fire alarm 12. The remote units of FIG. 1 comprise indicating devices 14, indicator devices 16, and combined indicating and indicator device 18. Indicating devices 14 are used to detect conditions indicative of an emergency, and may include manual call points, smoke detectors, and/or heat detectors. Indicator devices 16 are used to alert users of an emergency condition and may include audible or visual devices, such as lights and/or bells. The combined indicating and indicator device 18 has a detection capability alongside an alarm, and may comprise a fire and/or smoke alarm. Although not shown in FIG. 1, the fire system may further comprise fire suppression devices and/or a connection module for enabling communication with external devices.

The remote units 14, 16, 18 communicate with the fire panel 12 in a master-slave relationship. The remote units 14, 16, 18 send signals to the fire panel 12 through the wire 20 in the form of modulations in the current. These signals inform the fire panel 12 of the status of the remote units 14, 16, 18. The modulations in the current created by the remote units 14, 16, 18 may be increases or decreases in current, and may be encoded with information such as alarm, address, and/or fault information. For example, the modulations in current may be encoded with a digital binary code containing such information. In response, the fire panel 12 may issue a command to the remote units 14, 16, 18. For example, if indicating device 14 modulates the current in such a way that is indicative of a possible emergency, the fire panel 12 may send a command to the remaining remote units 14, 16, 18 instructing them to enter an alarm condition. Alternatively, the fire panel 12 may send this command to only some of the remote units 14, 16, 18, depending on the location and nature of the possible emergency. The command may be in the form of a modulation of the voltage, and may be encoded with information. For example, the command may be encoded with a digital binary code containing such information. Typically, the current is modulated in one direction through the loop, whilst the voltage is modulated in the opposite direction. The remote units 14, 16, 18 therefore each comprise a voltage sensor, and are configured to enter an alarm condition when they detect a voltage that is indicative of a possible emergency.

The fire panel 12 may also periodically send polling signals to the remote units 14, 16, 18, and the remote units 14, 16, 18 may respond with information regarding their status, their address, and/or their manufacturer code. The fire panel 12 may poll the remote units 14, 16, 18 at regular time intervals, which may be determined based on a communications protocol that the fire system 10 is employing. Thus, the frequency of polling may be determined by the communications protocol of the fire system 10. The fire panel 12 may poll the remote units 14, 16, 18 by transmitting one or more commands in the form of one or more polling signals. As mentioned above, these polling signals may be encoded with information, such as an address of a remote unit. This information may be used to communicate which remote unit 14, 16, 18 the polling signal is intended for. The fire panel 12 may comprise means for alerting a user of a possible emergency. These means can include, but are not limited to, lights and/or a display.

The operation of the fire panel 12 is controlled by a loop controller, which may be a central processing unit (CPU). The loop controller may process the information received from the remote units 14, 16, 18 and decide how to respond. The loop controller may decide whether it is necessary to communicate an alarm condition to some or all of the remaining remote units 14, 16, 18. The loop controller may cause the remote units 14, 16, 18 to enter an alarm condition at different times, in order to aid and manage evacuation of a building.

Figure 2:
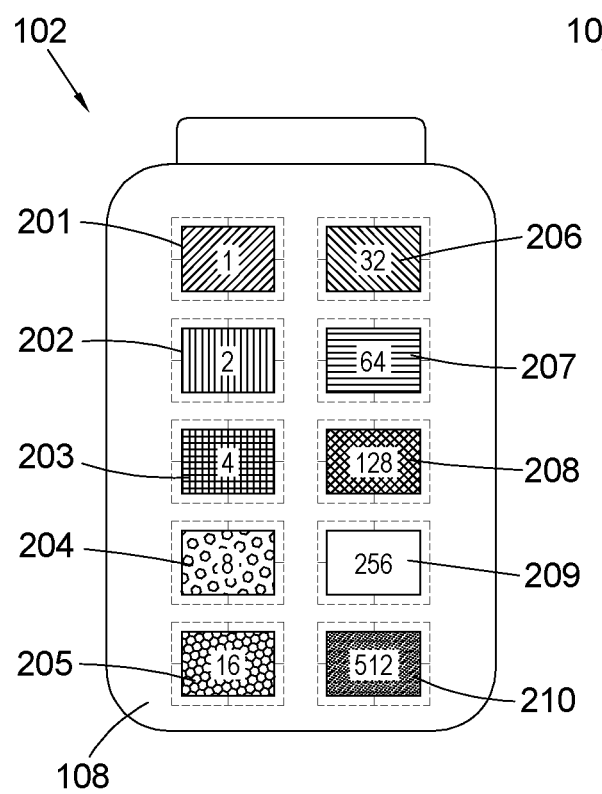
FIGS. 2 and 3 are top and bottom views of an address card for a remote unit.
Figure 3:
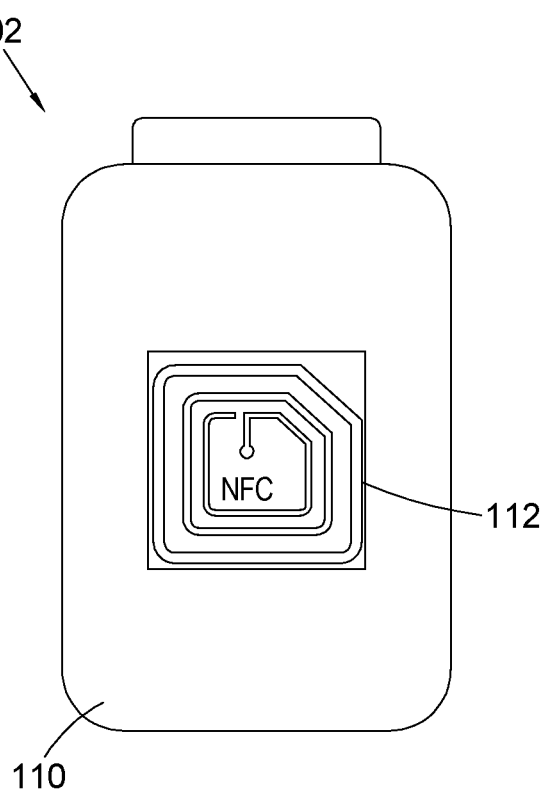

It is necessary for the various remote units 14, 16, 18 to be identifiable by the fire panel and/or by other systems, such as systems used by the installer. A colour based addressing system is proposed herein. FIGS. 2 and 3 are top and bottom views of an address card 102 for the remote unit 14, 16, 18. In this example address card is sized to be inserted into a card slot 104 of the remote unit 14, 16, 18. FIG. 4 shows a plan view of an example remote unit 14 with the address card 102 inserted; and FIG. 5 shows the remote unit of FIG. 4 in side view. In this case the remote unit is a fire or smoke alarm, but it will be appreciated that the same address system can be used for any other type of remote unit 14, 16, 18 on the fire loop, such as those discussed above The address card 102 includes a plurality of optically recognisable colour elements 201-210 for encoding an address. In this example there are 10 optically recognisable patches of colour 201-210, allowing for 1024 unique addresses with a binary encoding system. The optically recognisable colour elements 201-210 of this example each comprise patches of a distinct colour, and advantageously use brown, red, orange, yellow, green, blue, purple, grey, white and black with colours provided (e.g. by printing) using the same colour standards as colour coding for electrical resistor components (in particular the EIA colour code). Such colours can be readily identified by known RGB values and have also been selected to be readily distinguishable by the human eye. The following binary encoding system is used:

| Reference | Colour | R | G | B | Address/encoding |
| --- | --- | --- | --- | --- | --- |
| 201 | Brown | 116 | 66 | 0 | 1 |
| 202 | Red | 255 | 0 | 0 | 2 |
| 203 | Orange | 237 | 127 | 49 | 4 |
| 204 | Yellow | 255 | 255 | 0 | 8 |
| 205 | Green | 0 | 255 | 0 | 16 |
| 206 | Blue | 0 | 0 | 255 | 32 |
| 207 | Purple | 76 | 40 | 130 | 64 |
| 208 | Gray | 191 | 191 | 191 | 128 |
| 209 | White | 255 | 255 | 255 | 256 |
| 210 | Black | 0 | 0 | 0 | 512 |

The address card 102 is card-shaped, i.e. it is a sheet of relatively thin material and in this example it is a rectangle shape. The address card has a first flat surface 108 with the optically recognisable colour elements 201-210 visible thereon. There is a second flat surface 110 opposite the first surface 108, and the two surfaces are separated by a card thickness, such as a thickness in the range 0.5 to 2 mm. Optionally the address card 102 comprises a Near Field Communications (NFC) tag 112 and this is shown here on the second surface 110. The addition of a NFC tag can allow for an NFC memory with commissioning and/or manufacturing data relating to the address card 102 and/or to the remote unit 14. With the addition of an NFC tag the user, e.g. the installer or operator, may use an NFC reader to obtain added information from the address card 102. Further, the remote unit 14 may include an NFC reader 106 (as shown in FIG. 6) in order to provide a means to detect the presence/absence of the address card 102 as well as to potentially obtain more data from the address card 102 in addition to the address information that is detectable via the optically recognisable colour patches 201-210.

The address card 102 is for physical engagement with a card holder of the remote unit, which in this case is the card slot 104. The remote unit has a mounting for receiving the address card 102, which is a slot shaped card holder for fully or partially receiving the lengthwise extent of the address card 102. The remote unit includes a card slot 104 having an opening 114 for receiving the address card 102. The card slot 104 and the opening 114 have a width and height larger than the width and thickness of the address card 102 in order to permit insertion of the card. The card slot 104 has a length smaller than the length of the address card 102 in order that an end of the address card 102 protrudes from the card slot 104 when the address card 102 is inserted therein.

Further features of the remote unit(s) and interaction thereof with the address card 102 will now be described with reference to FIGS. 4 to 7. The remote unit 14 comprises one or more optical sensor 116 for identifying colour characteristics of the optically recognisable colour elements 201-210, and a control system 118, which in this case is a microprocessor on a control board 120 of the remote unit 14. The control system 118 is for determining an address from the colour characteristics as well as for controlling other aspects of the operation of the remote unit 14. As is seen in FIG. 6, or alternatively in FIG. 7, the address card 102 within the card slot 104 is adjacent the one or more optical sensor(s) 116 and, in this example, an optional NFC reader 106. The control system 118 is coupled to the optical sensor 116, such as via the control board 120, in order to receive an output signal from the optical sensor 116. The output signal may be indicative of the colour characteristics, such as a signal comprising a data representative of the colour characteristics. Thus, the control system 118 can be configured to determine the address from the address card 102 by use of the optical sensor 116 to "read" the encoding of the optically recognisable colour elements 201-210 of the address card 102. In some examples the optical sensor 116 is in communication with the control system via Inter-Integrated Circuit (I2C) communications. The connections to the control system 118 and or control board 120 may also include a power connection for the optical sensor 116.

Figure 6:
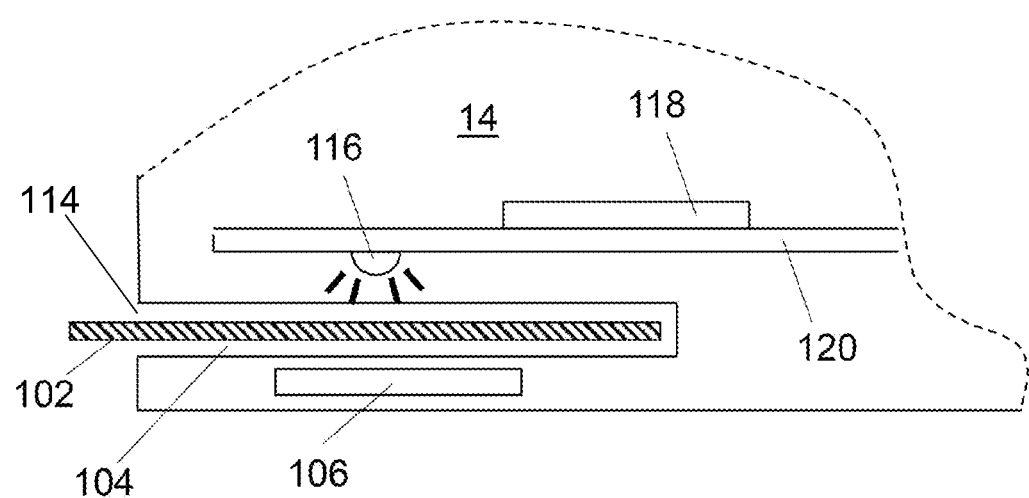
FIG. 6 is a schematic diagram of section of a remote unit including a card slot and related parts.
Figure 7:
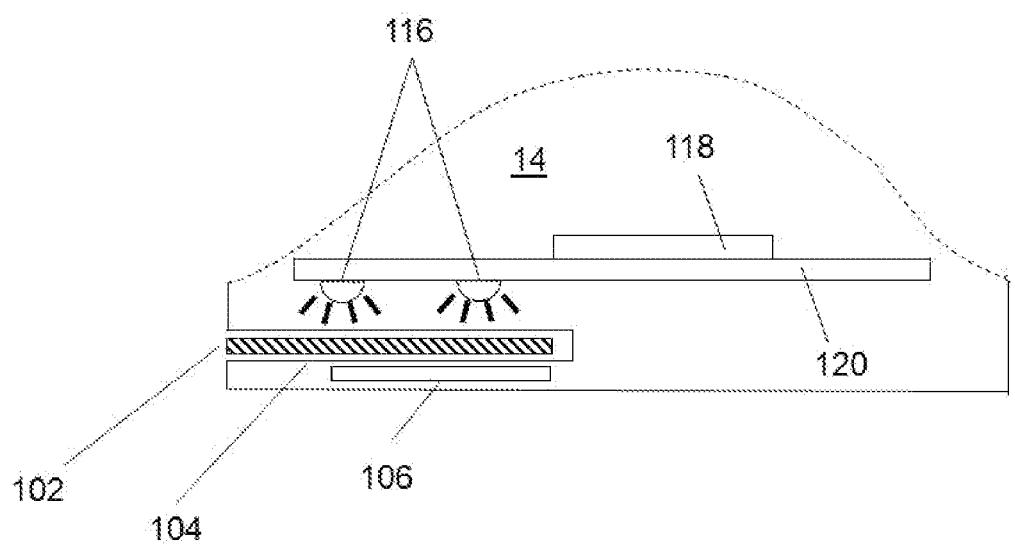
FIG. 7 shows another example of the same section of the remote unit as FIG. 6.

In FIG. 6 a single optical sensor 116 is used. FIG. 7 shows another example using two optical sensors 116, typically two identical optical sensors 116. It would of course also be possible to use more than two optical sensors 116. Depending on the capabilities of the optical sensor 116 it can be necessary to use multiple sensors 116 in an array where each sensor provides good sensor readings for a different portion of the first surface 108 of the address card 102. Each optical sensor 116 of multiple sensors 116 can hence provide readings of the colour characteristics of a different set of the optically recognisable colour elements 201-210, optionally for overlapping sets thereof.

One possible type of optical sensor 116 is a RGB (red, green, blue) colour sensor, which may be a colour light-to-digital convertor. Such a sensor provides a digital output signal indicating red, green and blue sensing values of the sensed colour(s) as well as optionally a clear light sensing value. One example sensor is the TCS3472 RGB sensor as manufactured by ams AG of Austria.

With this addressing system it is possible to allow for a large number of unique addresses that can be provided to the remote unit 14, 16, 18 during installation, or otherwise, simply by inserting the relevant address card 102 into the card slot 104 of the remote unit 14, 16, 18. This enables a quick and reliable installation/set-up for the address system, as well as considerably simplifying the remote unit 14, 16, 18 compared to the prior art devices using electronic or electro-mechanical devices for addressing. The use of optical sensors 116 rather than mechanical elements removes one source of potential failure and/or error in the address system.

What is claimed is:

1. An address system for at least one fire loop, the address system comprising:
   a remote unit for installation on the fire loop, wherein the remote unit is for addressable communication via the fire loop; and
   an address card for use with the remote unit in order to provide an address for the remote unit;
   wherein the address card includes one or more of a plurality of optically recognisable colour elements for encoding an address; and
   wherein the remote unit comprises an optical sensor for identifying colour characteristics of the optically recognisable colour elements, and a control system for determining the address from the colour characteristics.

2. An address system as claimed in claim 1, wherein the address card includes one or more of a set of possible optically recognisable colour elements and the presence or absence of the possible optically recognisable colour elements is detectable by the optical sensor.

3. An address system as claimed in claim 1, wherein control system is coupled to the optical sensor in order to receive an output signal from the optical sensor; and wherein the output signal is indicative of the colour characteristics.

4. An address system as claimed in claim 1, wherein the optical sensor is a RGB (red, green, blue) colour sensor configured to provide a digital output signal indicating at least red, green and blue sensing values of the sensed colour(s).

5. An address system as claimed in claim 1, wherein the address card provides the address by means of binary encoding via the optically recognisable colour elements, and wherein the presence or absence of a colour relates to a binary value.

6. An address system as claimed in claim 1, wherein the plurality of optically recognisable colour elements each comprise patches of a distinct colour with at least six differing colours, such as at least six of brown, red, orange, yellow, green, blue, purple, grey, white and black.

7. An address system as claimed in claim 6, wherein all ten of the listed colours are used and the colours comply with colours defined for the EIA colour code.

8. An address system as claimed in claim 1, wherein the remote unit comprises a card holder for fully or partially receiving the extent of the address card.

9. An address system as claimed in claim 1, wherein the address card comprises a Near Field Communications (NFC) tag having an NFC memory with commissioning and/or manufacturing data relating to the address card and/or to the remote unit.

10. An address system as claimed in claim 9 wherein the remote unit includes an NFC reader in order to provide a means to detect the presence/absence of the address card as well as to potentially obtain more data from the address card in addition to the address information that is detectable via the optical sensor.

11. An address system as claimed in claim 1, comprising multiple remote units for the at least one fire loop, wherein addressing for the multiple remote units is provided by means of multiple address cards; and wherein the different address cards for the multiple remote units advantageously have differing patterns of colour by means of a differing set of one or more of the plurality of optically recognisable colour elements.

12. A fire system comprising multiple remote units and corresponding multiple address cards and at least one fire loop, wherein the remote units and address cards together provide an address system as claimed in claim 11.

13. A method for addressing a remote unit on a fire loop using an address system as claimed in claim 1, the method comprising: providing the address card at the remote unit, using the optical sensor to detect the colour characteristics of the one or more optically recognisable colour elements, and using the control system to determine the address from the colour characteristics.

14. A method as claimed in claim 13, comprising using binary encoding via the optically recognisable colour elements of the address card, wherein the presence or absence of a colour relates to a binary value and wherein the one or more of the plurality of optically recognisable colour elements are selected from at least six differing colours.

15. A method as claimed in claim 13, wherein the method is repeated for multiple remote units as described above, wherein each remote unit is provided with an address card having a unique address, and wherein the different address cards for the multiple remote units have differing patterns of colour by means of a differing set of one or more of the plurality of optically recognisable colour elements.

\* \* \* \* \*